US011171858B2

(12) United States Patent
Martinez et al.

(10) Patent No.: US 11,171,858 B2
(45) Date of Patent: Nov. 9, 2021

(54) METHOD FOR TESTING NETWORK SERVICES

(71) Applicant: NOKIA SOLUTIONS AND NETWORKS OY, Espoo (FI)

(72) Inventors: Manuel Martinez, Gijon (ES); Vilmos Csaba Rotter, Pomaz (HU); Csaba Szalai, Gyongyos (HU); Zsombor Kiss, Gyál (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/051,364

(22) PCT Filed: May 3, 2018

(86) PCT No.: PCT/EP2018/061334
§ 371 (c)(1),
(2) Date: Oct. 28, 2020

(87) PCT Pub. No.: WO2019/210958
PCT Pub. Date: Nov. 7, 2019

(65) Prior Publication Data
US 2021/0092040 A1    Mar. 25, 2021

(51) Int. Cl.
*H04L 12/26* (2006.01)
*H04L 12/24* (2006.01)
*H04L 29/08* (2006.01)

(52) U.S. Cl.
CPC .............. *H04L 43/50* (2013.01); *H04L 41/14* (2013.01); *H04L 67/16* (2013.01)

(58) Field of Classification Search
CPC .......... H04L 43/50; H04L 41/14; H04L 67/16
See application file for complete search history.

(56) References Cited

U.S. PATENT DOCUMENTS 7,313,629 B1 * 12/2007 Nucci .................. H04L 41/145
  709/238
8,190,768 B2 * 5/2012 Oba ...................... H04W 36/30
  709/238

(Continued)

OTHER PUBLICATIONS

International Search Report and Written Opinion dated Sep. 26, 2018 corresponding to International Patent Application No. PCT/EP2018/061334.

(Continued)

*Primary Examiner* — Sm A Rahman
(74) *Attorney, Agent, or Firm* — Squire Patton Boggs (US) LLP

(57) ABSTRACT

An apparatus and method for testing includes acquiring a plurality of candidate network functions of a network service defined by network functions required by the network service and links between the network functions. The plurality of candidate network functions includes at least one candidate network function for each required network function, and includes a plurality of candidate network functions for at least one required network function. Links between the candidate network functions are tested, and a link performance metric for each tested link is determined. A candidate network service for end-to-end performance estimation is built from candidate network functions having interfaces for which the link performance metrics indicate performance above a threshold. An end-to-end performance metric for the candidate network service is estimated based on the link performance metrics. The candidate network service is output to a production environment based on the estimated performance metric.

20 Claims, 6 Drawing Sheets

(56) References Cited

U.S. PATENT DOCUMENTS

| | | | | |
|---|---|---|---|---|
| 10,116,571 B1* | 10/2018 | Bertz | ............... | H04L 67/38 |
| 10,572,650 B2* | 2/2020 | Cooper | ............... | G06F 21/44 |
| 2013/0297769 A1 | 11/2013 | Chang et al. | | |
| 2014/0201374 A1* | 7/2014 | Ashwood-Smith | ....... | G06F 9/50 |
| | | | | 709/226 |
| 2016/0182345 A1* | 6/2016 | Herdrich | ............... | G06F 12/084 |
| | | | | 709/224 |
| 2016/0261505 A1* | 9/2016 | Saniee | ............... | H04L 67/303 |
| 2018/0069749 A1 | 3/2018 | Singhal et al. | | |

OTHER PUBLICATIONS

Steven Van Rossem et al.: "A network service development kit supporting the end-to-end lifecycle of NFV-based telecom services," 2017 IEEE Conference on Network Function Virtualization and Software Defined Networks (NFV-SDN), IEEE, Nov. 6, 2017, pp. 1-2, XP033264709.

International Preliminary Report on Patentability dated Nov. 3, 2020 corresponding to International Patent Application No. PCT/EP2018/061334.

* cited by examiner

METHOD FOR TESTING NETWORK SERVICES

FIELD

Various embodiments described herein relate to testing network services.

BACKGROUND

During the past years, plenty of innovation has occurred on virtualization techniques that allow a service to be provided essentially from anywhere around the globe through various service components. In near future, network operators can be envisaged to evolve towards the aforementioned best practices and thus, the network operators will be able to provide several network services in a more efficient way. Strict agreements that typically were signed with vendors will change, allowing service providers to decide which components—or network functions—best fit their needs regardless of a company or instance that has designed the network functions.

BRIEF DESCRIPTION OF THE INVENTION

The invention is defined by the subject-matter of the independent claims. Embodiments are defined in the dependent claims.

According to an aspect, there is provided a testing system comprising: means for acquiring, in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service; means for testing links between the candidate network functions and determining a link performance metric for each tested link; means for building a candidate network service for end-to-end performance estimation from candidate network functions having interfaces for which the link performance metrics indicate performance above a determined threshold; means for estimating an end-to-end performance metric for the candidate network service on the basis of the link performance metrics of the candidate network service; and means for outputting the candidate network service to a production environment on the basis of the estimated end-to-end performance metric.

In an embodiment, the means are further configured to perform said testing of the links between the candidate network functions that comprises at least acquiring the candidate network functions from a network function repository that comprises a plurality of candidate network functions for each network function of the network service.

In an embodiment, the plurality of candidate network functions comprises different versions for the same network function.

In an embodiment, the means are further configured further to perform: selecting, on the basis of the estimated end-to-end performance metric, the candidate network service for end-to-end testing; applying one or more test procedures to test the end-to-end performance of the candidate network service and acquiring at least one test result indicating a tested end-to-end performance for the candidate network service; and using the at least one test result as an input when estimating the end-to-end performance metric for the candidate network service or for another candidate network service.

In an embodiment, the means are further configured perform: outputting the candidate network service to the production environment, if the at least one test result indicates end-to-end performance above a determined performance level.

In an embodiment, the means are further configured to use neural network when performing said estimating.

In an embodiment, the means are further configured to provide a new candidate network service by performing at least the following: determining implementations of the network service that are currently in the production environment, each implementation formed by a set of network function implementations together implementing the network service; selecting at least one new candidate network function for testing on the basis of the determined implementations of the network service that are currently in the production environment; performing said link testing for a link between the selected new candidate network function and at least one network function implementation currently in the production environment; and performing said building for the new candidate network service from the new candidate network function and network function implementations that are currently in the production environment.

In an embodiment, the means are further configured to select the at least one new candidate network function on the basis of a number of new implementations of the network service the new candidate network function can provide.

In an embodiment, the means are further configured to select the at least one new candidate network function on the basis of improving resiliency of the network service for a situation where a network function in the production environment fails.

In an embodiment, the link performance metric and the end-to-end performance metric comprise at least one of the following performance metrics: quality-of-service, data throughput, latency, and error performance.

In an embodiment, the means comprises at least one processor and at least one memory including a computer program code, wherein the at least one memory and the computer program code are configured, with the at least one processor, to cause the performance of the testing system.

According to another aspect, there is provided a method for testing an implementation of a network service provided in a network, the method comprising: acquiring, by a testing system operating in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service; testing, by the testing system, links between the candidate network functions and determining a link performance metric for each tested link; building, by the testing system, a candidate network service for end-to-end performance estimation from candidate network functions having interfaces for which the link performance metrics indicate performance above a determined threshold; estimating, by the testing system, an end-to-end performance metric for the candidate network service on the basis of the link performance metrics of the candidate network service; and outputting, by the testing system, the candidate network service to a production environment on the basis of the estimated end-to-end performance metric.

In an embodiment, said testing the links between the candidate network functions comprises acquiring the candidate network functions from a network function repository comprising a plurality of candidate network functions for each network function of the network service.

In an embodiment, the plurality of candidate network functions comprises different versions for the same network function.

In an embodiment, the method further comprises: selecting, on the basis of the estimated end-to-end performance metric, the candidate network service for end-to-end testing; applying one or more test procedures to test the end-to-end performance of the candidate network service and acquiring at least one test result indicating a tested end-to-end performance for the candidate network service; and using the at least one test result as an input when estimating the end-to-end performance metric for the candidate network service or for another candidate network service.

In an embodiment, the candidate network service is output to the production environment, if the at least one test result indicates end-to-end performance above a determined performance level.

In an embodiment, said estimating is performed by using a neural network.

In an embodiment, the method further comprises providing, by the testing system, a new candidate network service by performing at least the following: determining implementations of the network service that are currently in the production environment, each implementation formed by a set of network function implementations together implementing the network service; selecting at least one new candidate network function for testing on the basis of the determined implementations of the network service that are currently in the production environment; performing said link testing for a link between the selected new candidate network function and at least one network function implementation currently in the production environment; and performing said building for the new candidate network service from the new candidate network function and network function implementations that are currently in the production environment.

In an embodiment, the at least one new candidate network function is selected on the basis of a number of new implementations of the network service the new candidate network function can provide.

In an embodiment, the at least one new candidate network function is selected on the basis of improving resiliency of the network service for a situation where a network function in the production environment fails.

In an embodiment, the link performance metric and the end-to-end performance metric comprise at least one of the following performance metrics: quality-of-service, data throughput, latency, and error performance.

According to yet another aspect, there is provided a computer program comprising instructions for causing an apparatus to perform at least the following: acquiring, in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service; testing links between the candidate network functions and determining a link performance metric for each tested link; building a candidate network service for end-to-end performance estimation from candidate network functions having interfaces for which the link performance metrics indicate performance above a determined threshold; estimating an end-to-end performance metric for the candidate network service on the basis of the link performance metrics of the candidate network service; and outputting the candidate network service to a production environment on the basis of the estimated end-to-end performance metric.

In an embodiment, there is provided a computer program distribution medium comprising the above-described computer program. In an embodiment, the computer-readable medium is non-transitory.

LIST OF DRAWINGS

In the following, the invention will be described in greater detail with reference to the embodiments and the accompanying drawings, in which FIG. 1 illustrates a network to which embodiments of the invention may be applied;

DESCRIPTION OF EMBODIMENTS

Figure 1:
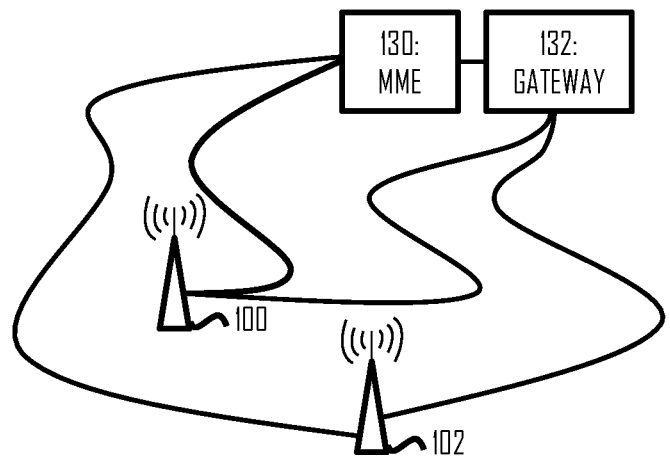

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a communication network such as a cellular communication system which may be one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system The embodiments are not, however, restricted to the systems given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

The system of FIG. 1 comprises access nodes 100, 102 providing and managing respective cells. A cell may be a macro cell, a micro cell, femto cell, or a pico cell, for example. From another point of view, the cell may define a coverage area or a service area of the access node. The access nodes may each be an evolved Node B (eNB) as in the LTE and LTE-A, an access node of a 5G network, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) with wireless access to other networks such as the Internet.

The access nodes may be connected via an interface to a core network of the cellular communication system. The LTE specifications specify the core network as an evolved packet core (EPC), and the core network may comprise a mobility management entity (MME) 130 and a gateway (GW) node 132. In the LTE system, the GW may be a serving gateway (S-GW) or a packet data network gateway (P-GW). The MME may handle mobility of terminal devices in a tracking area encompassing a plurality of cells and also handle signalling connections between the terminal devices and the core network. The MME may further carry out authentication and integrity protection for terminal devices. The gateway node may handle data routing in the core network and to/from the terminal devices.

The core network and a radio network of access nodes may form a wireless access network providing the terminal devices with wireless access and data transfer capability with the other networks. The wireless access and the data transfer may be construed as a network service (NS). The network service is provided by a plurality of network functions (NF), each network function being provided by one of the logical elements of the communication network, i.e. the access node, the MME, and the gateway. The interfaces between the elements may correspond to links between the network functions of the network service.

Figure 2:
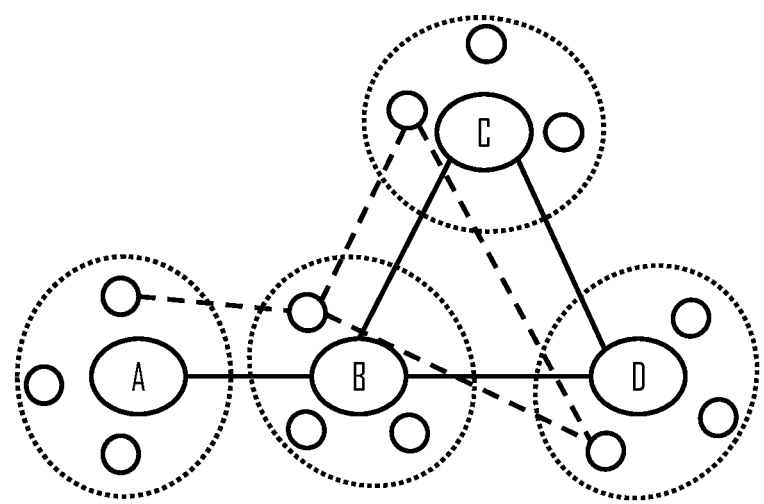
FIG. 2 illustrates a network service and network functions according to an aspect of the invention.

FIG. 2 illustrates an embodiment of a network service formed by a set of inter-connected network functions A, B, C, and D. The solid lines between the network functions represent the links or interfaces between the network functions in the network service. As described in Background, there may be numerous implementations of the same network function available to a network operator. The implementations may represent different software versions of the same network function, for example. At least some of the different implementations may be provided by different, independent vendors. The number of network functions in the network service may be limited but the number of different implementations of each network function may be very high, much higher than the number of network functions in the network service. In FIG. 2, the implementations of the same network function are illustrated by small dots encircled within the same dotted circle around each network function. Network functions connected by the solid lines define the network service in the form of the network function and how they interface with one another. One implementation of the network service is illustrated in FIG. 2 by implementations of the network functions connected by dash lines. As the number of implementations of the network functions n increase, so does the number of possible links between the implementations. The total number of possible implementations of the network service is nm where m is the number of network functions in the network service. When the number of implementations n is much higher than the number of network functions m, the total number of possible links is in the order of $n^2$ which still results in a high number of links. When the implementations of the network functions are independent and the network operator may build the network service from a composition of different implementations, testing the links between the implementations is important in terms of providing a reliable service.

Figure 3:
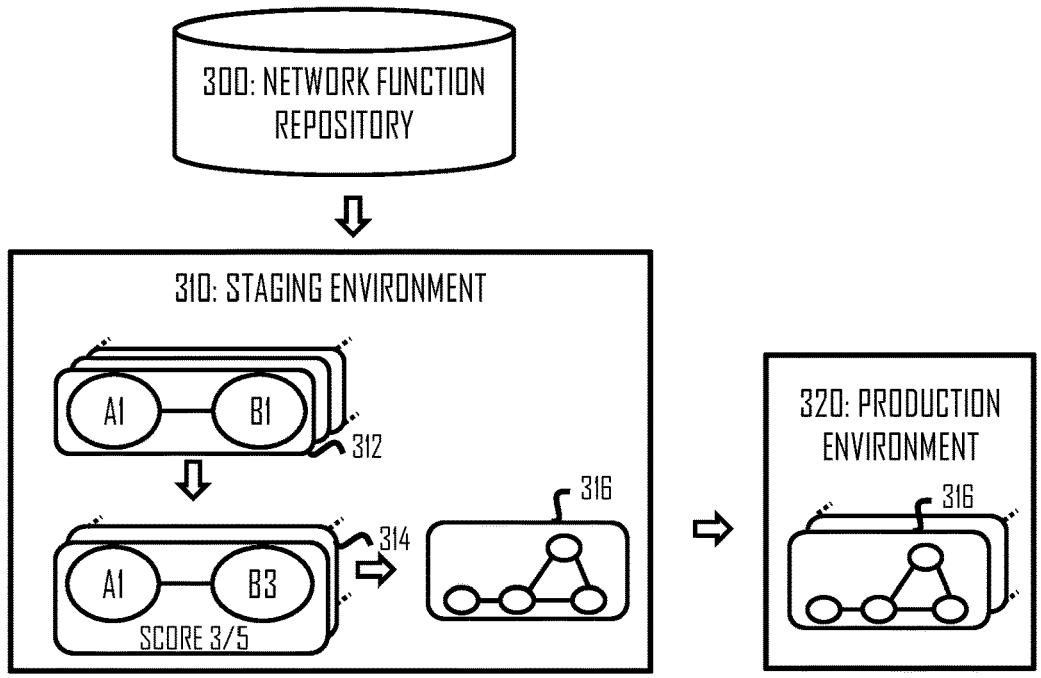
FIG. 3 illustrates a network service testing scenario according to an embodiment.

Referring to FIG. 3, some embodiments of the invention provide a testing system employing a staging environment 310 where the testing system tests the links between the implementations of the network functions and, further, tests candidate network services before applying the network service implementation to real users. The staging environment 310 may be a virtual environment isolated from a real service provision of the network, a production environment 320. Tested and selected network service implementations whose performance has been verified in the staging environment 310 may be brought into the production environment 320 for implementing the network service to client devices such as UEs of a cellular communication system.

Let us now describe a general flow of testing the links network functions and the network services in the staging environment 310. The testing system may acquire candidate network functions for testing from a network function repository 300. A candidate network function may be considered as an implementation of a network function in the staging environment 310. The repository 300 may store all the implementations of the network functions available to the network operator. The testing system may acquire multiple pairs of candidate network functions (illustrated by 312) inter-connected by a link in the network service. In the Figures A1, A2 etc. represent different implementations of network function A, B1, B2 etc. represent different implementations of network function B, and so on. Upon acquiring at least two candidate network functions inter-connected by a link in the network service, the testing system may start testing the link between the candidate network functions. The testing may comprise inputting test data to one of the candidate network functions and measuring output of the other one of the candidate network functions, and/or vice versa. The testing may comprise testing performance of the cooperation of the candidate network functions. The performance may be determined in terms of quality-of-service (QoS), latency, data throughput, error performance, link security, etc. As a result of the link testing, the testing system may determine a performance metric for the link. The tested link 314 may be associated with the performance metric, e.g. a score or a fitness value.

Upon testing a sufficient number of links such that a candidate network service 316 may be built, the testing system may form the candidate network service 316 from the set of tested candidate network functions 314 and estimate end-to-end performance of the candidate network service 316. If the performance is satisfactory to the testing system, the candidate network service may be output to the production environment 320.

Figure 4:
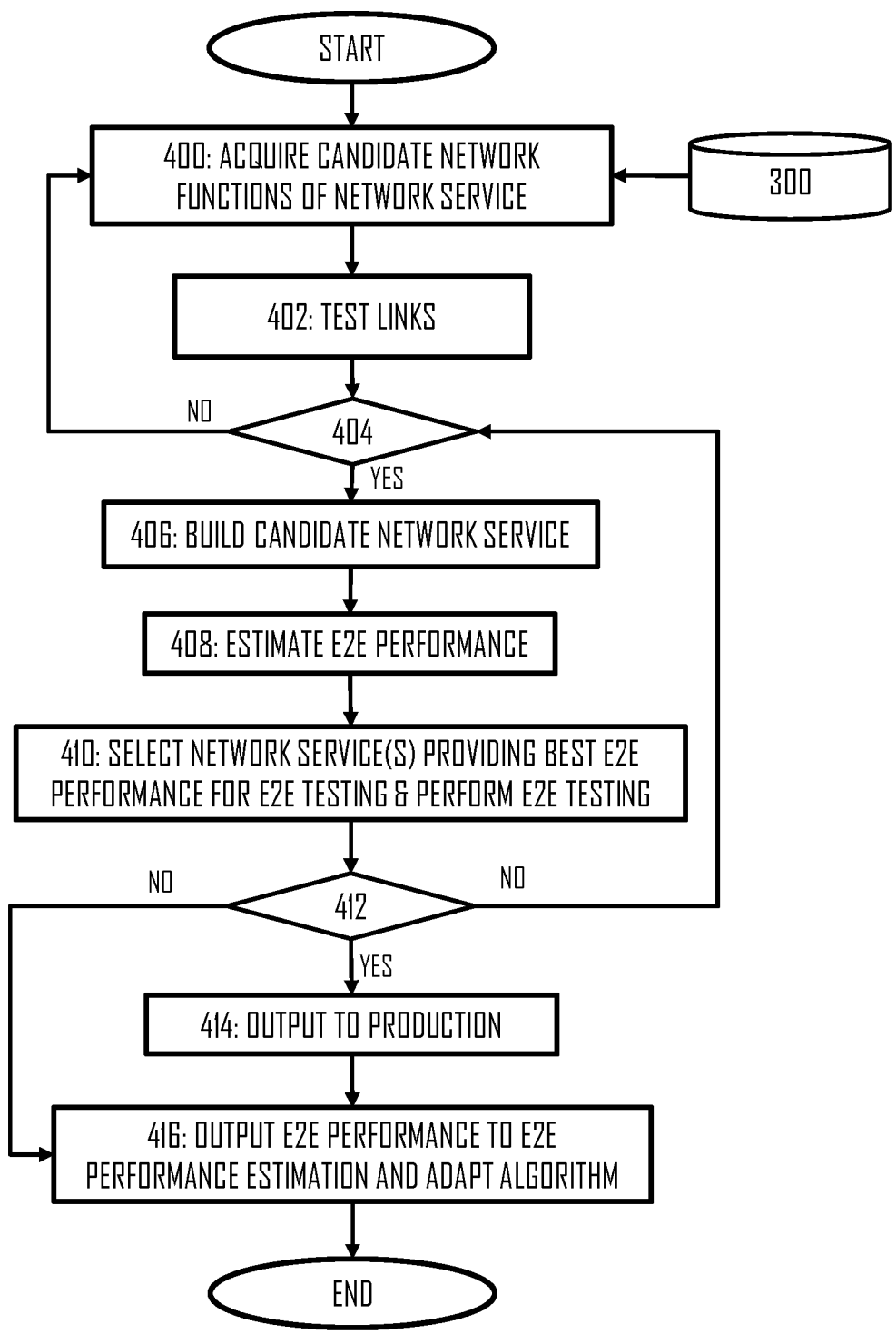
FIG. 4 illustrates a process for performing testing of an implementation of a network service according to an embodiment of the invention.

FIG. 4 illustrates a flow diagram of the above-described procedure performed by the testing system. Referring to FIG. 4, the process comprises acquiring a plurality of candidate network functions of a network service (block 400). The network service is defined by network functions required by the network service and links between the network functions. The plurality of candidate network functions includes at least one candidate network function for each network function required by the network service and includes a plurality of candidate network functions for at least one network function required by the network service. In block 402, links between the candidate network functions are tested and a link performance metric for each tested link is determined.

In block 404, the testing system determines whether or not it can build a candidate network service from the set of tested links. Block 404 may comprise comparison of the link performance metrics with a determined performance threshold. Upon determining that further links need to be tested, the process may return to block 400. Upon determining that there exist the candidate network functions having links tested and verified to meet the performance threshold, the testing system may build a candidate network service for end-to-end performance estimation (block 406). In block 408, the testing system estimates an end-to-end (E2E) performance metric for the candidate network service on the basis of the link performance metrics of the candidate network service. In block 410, the testing system determines whether or not to proceed the candidate network service for E2E performance testing. For example, upon estimating the E2E performance for a set of candidate network services, the testing system may select one or more candidate network services for the real E2E testing. In another embodiment, the testing system may use another criterion in the selection, e.g. determine for each candidate network service whether or not the estimated E2E performance is above a determined performance threshold. If the performance is deemed to be better than that associated by the threshold level, the testing system may select the candidate network service for the E2E testing. The threshold may be fixed or adjustable. For example, the threshold level may be the highest E2E performance amongst the network service implementations in the staging environment. As a consequence, upon detecting a candidate network service having a better estimated E2E performance than the highest E2E performance in the production environment, the candidate network service is selected for the E2E testing. The selection and the E2E testing may be carried out together in block 410, or they may be logically and physically separate operations.

In the E2E testing, the performance of the candidate network service is tested by virtually generating the candidate network service, executing the candidate network service in the staging environment, and testing its performance, e.g. by applying real inputs and measuring outputs. The testing may involve state-of-the-art network service testing methods. The testing may include load testing, stress testing, conformance testing, etc. Various testing metrics may be determined for the candidate network service, such as how many users can served with a certain reliability or quality-of-service, a throughput and/or latency and/or error rates of the candidate network service with various traffic loads, and so on.

As can be seen from above, the E2E testing may be a procedure requiring high amount of computation resources compared with the computationally simple E2E performance estimation which may employ an algorithm that maps the link performance metrics to the estimated E2E performance metric. Therefore, by performing the pre-screening of the candidate network services before the E2E testing provides an efficient solution for bringing new network service implementations to the production environment.

The testing may include testing the same performance metric that was estimated in block 408. Upon completing the testing of the selected candidate network service, it is determined in block 412 whether or not the tested performance of the candidate network service is high enough for the production environment. One or more performance criteria may be used in the determining, and the determining may base on the real testing of the candidate network service. If the performance is deemed to be high enough, the candidate network service is brought to the production environment (block 414). If the performance is deemed to be below the required level, the process may return to block 404 for selection of one or more new candidate network functions and generation of a new candidate network service. In another embodiment, the process may return to the selection of a new candidate network service for the real E2E testing in case there are available candidate network service (s) for which block 408 has already been performed.

In both cases, the process may execute block 416 as a result of block 412. In block 416, the real performance tested in block 410 is input to the E2E estimation procedure. This enables adaptation of the E2E estimation to more accurately estimate the E2E performance. The E2E estimation algorithm may, for example, perform one or more adjustments that reduce an error between the E2E performance estimated in block 408 and the real E2E performance tested in block 410. A neural network algorithm is described as one embodiment for estimating the E2E performance, and the adjustment may include performing a learning procedure in the neural network as a result of the input of the tested E2E performance.

As the number of implementations of the network functions is very high, the testing may be executed in the staging environment while the network operator is providing one or more implementations of the network service in the production environment. Provision of multiple implementations of the network service is beneficial in preparation for a situation where an implementation of the network service in the production environment suffers a failure, e.g. one or more of the network functions of the implemented network service fails. In such a case, having a tested replacement at hand reduces an outage time of the network service. The network operator may carry out selection of a network service implementation for provision of the network service amongst the multiple implementations available. The selection may be based on tested performance of the implementations available in the production environment. For example, the implementation providing the best performance may be selected and the network service may be provided by using that implementation.

In an embodiment, the testing of different links in the staging environment is carried out in parallel processes. Furthermore, E2E performance estimation and the real testing of the different candidate network services may be carried out as parallel processes, e.g. by different processors of the testing system.

Figure 5:
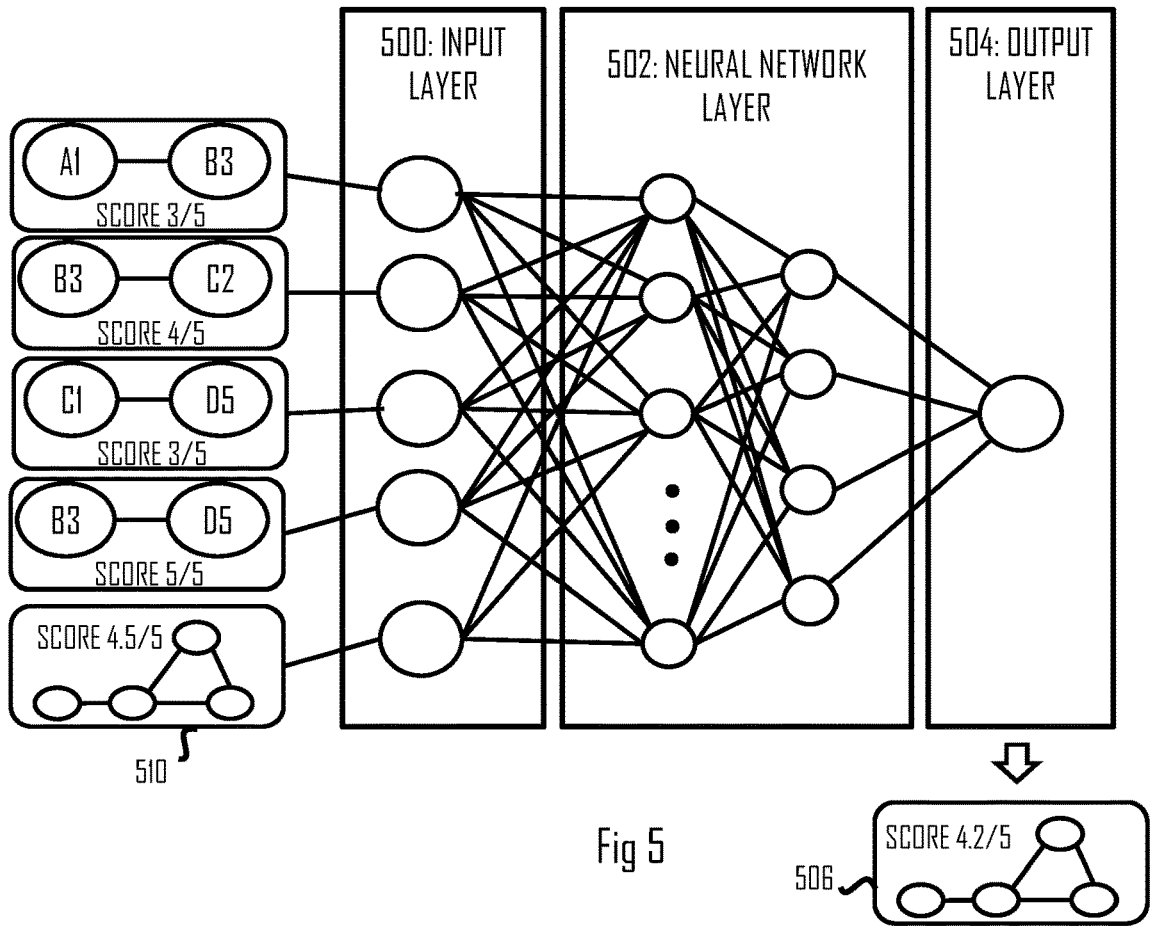
FIG. 5 illustrates an embodiment for estimating end-to-end performance of a candidate network service implementation according to an embodiment of the invention.

In an embodiment, the E2E performance of a candidate network service is estimated by using an algorithm that uses the link performance metrics as inputs. In an embodiment, the algorithm employs a neural network. FIG. 5 illustrates a simplified implementation of a neural network algorithm. The neural network may comprise an input layer 500 receiving inputs from the link testing (block 402). The inputs may identify each link tested and associated link performance metric.

In an embodiment, the topology of the network service is input to the neural network. The neural network may employ the topology in the E2E performance estimation. For example, the neural network may identify one or more bottleneck links of the network service and assign a higher-than-average weight to the effect of such links on the E2E performance.

The input layer 500 may then feed the inputs to a neural network layer 502 implementing the neural network that computes the E2E performance from the received inputs. The neural network is typically illustrated by neurons (circles in FIG. 5) and synapses (lines in FIG. 5) connecting the neurons. The synapses may be assigned with different weights according to an implementation of the neural network. The neural network is a machine learning system that evolves and learns as it operates. The result of the neural network processing is output by an output layer, and the output may be the estimated E2E performance for the candidate network service (illustrated by 506).

In an embodiment, the input layer 500 may receive, as a further input, a end-to-end performance metric for a candidate network service for which the real E2E testing has been performed (illustrated by 510). This E2E performance metric has been tested by using the real testing procedures and, thus, represents the true performance of the candidate network service more accurately than the estimate of the neural network. The neural network may use this feedback from the real testing to reconfigure the neural network and to improve the estimation of the E2E performance of future candidate network services. As described above, the learning may involve performing one or more reconfigurations to the neural network that reduce the error between the estimated E2E performance and the tested E2E performance for the candidate network service. This reconfiguration may reconfigure the neural network on a general level which means that learning made in connection with one candidate network service may be applied to the other candidate network services of the same network service.

In another embodiment, the neural network may be replaced by another algorithm that maps the link performance metrics of the candidate network function to an E2E performance metric. In a simple embodiment, the algorithm may carry out a simple averaging or a weighted averaging of the link performance metrics. In another simple embodiment, the algorithm may select the lowest link performance metric as the E2E performance metric.

Figure 6:
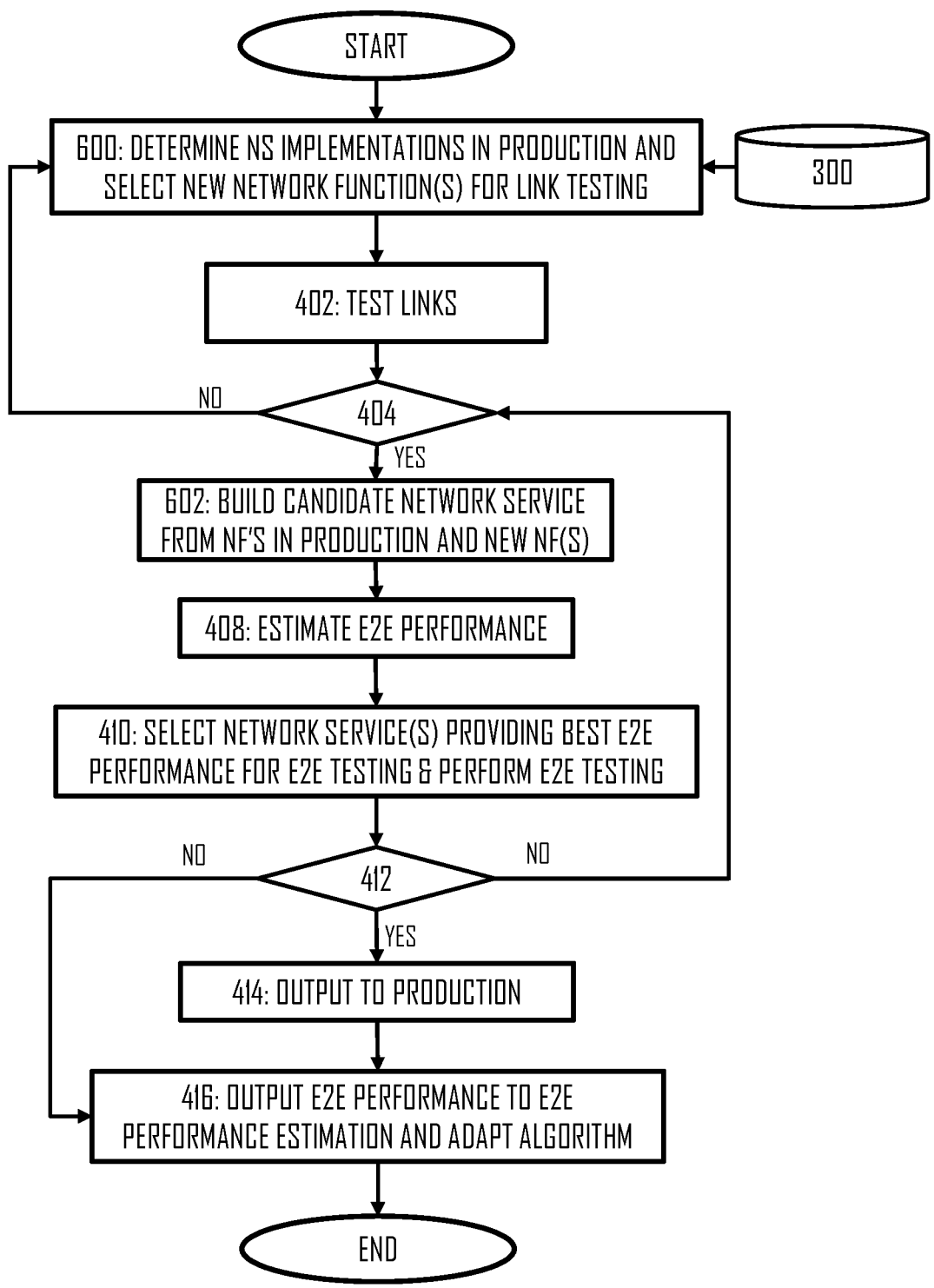
FIG. 6 illustrates a process for generating a new network service implementation according to an embodiment of the invention.

Let us now describe some embodiments for prioritizing selection of new candidate network functions. The testing system may carry out the prioritization by considering the network service implementations currently in the production environment. FIG. 6 illustrates an embodiment of a process for generating a new candidate network service. Referring to FIG. 6, the process may comprise determining implementations of the network service that are currently in the production environment (block 600). Each implementation may be formed by a set of network function implementations that together implement the network service. The testing system may then select at least one new candidate network function for testing on the basis of the determined implementations of the network service that are currently in the production environment (block 600). The candidate network functions may be retrieved from the repository 300. In block 402, the testing system performs the link testing for a link between the selected new candidate network function and at least one network function implementation currently in the production environment. Block 404 may be carried out in the above-described manner. In block 602, the testing system builds the new candidate network service from the new candidate network function and network function implementations that are currently in the production environment. In some embodiments, the number of new candidate network functions at this stage may be one or more, and the number of network function implementations that are currently in the production environment may be one or more. Thereafter, the procedure may be carried out in the above-described manner in blocks 408 to 416. In some embodiments, block 416 may be carried out before block 414.

Figure 7:
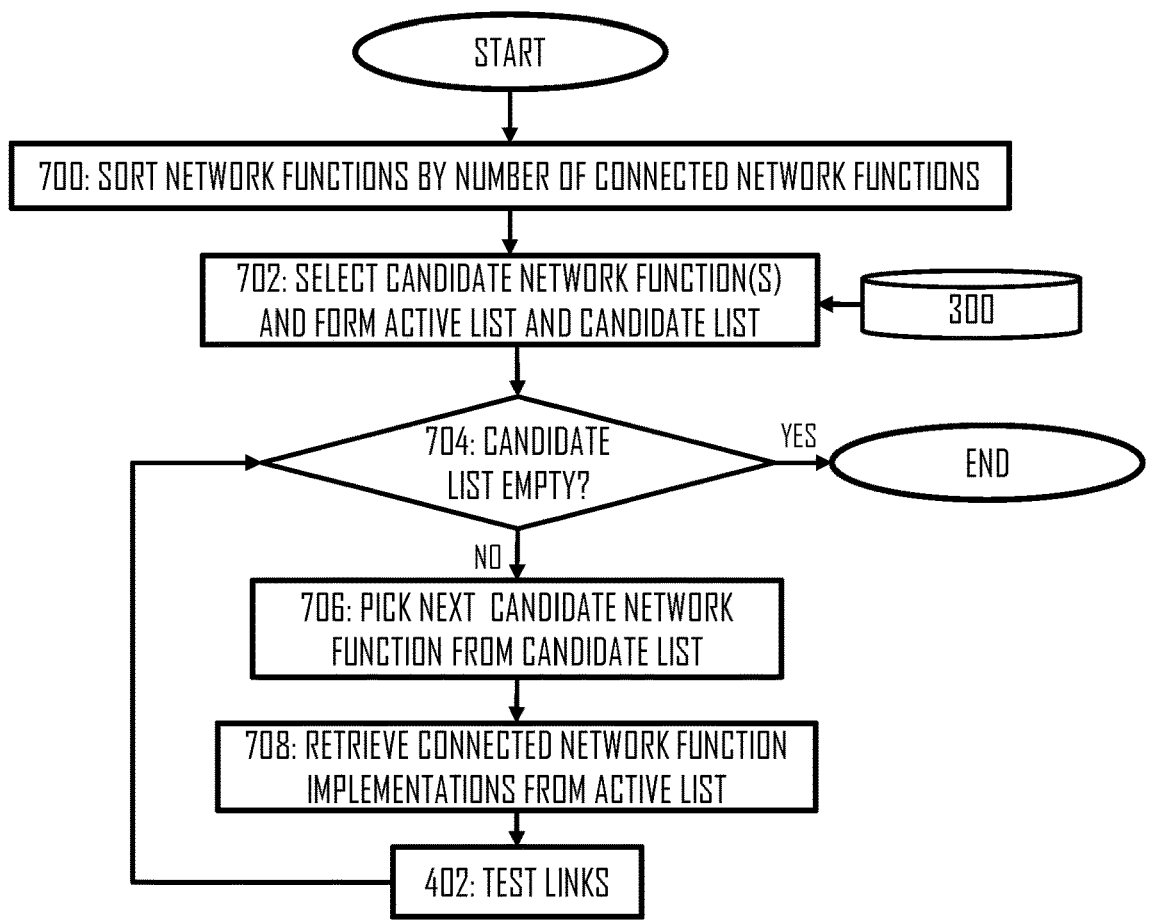
FIGS. 7 and 8 illustrate embodiments of a process for using prioritization when selecting new candidate network functions.
Figure 8:
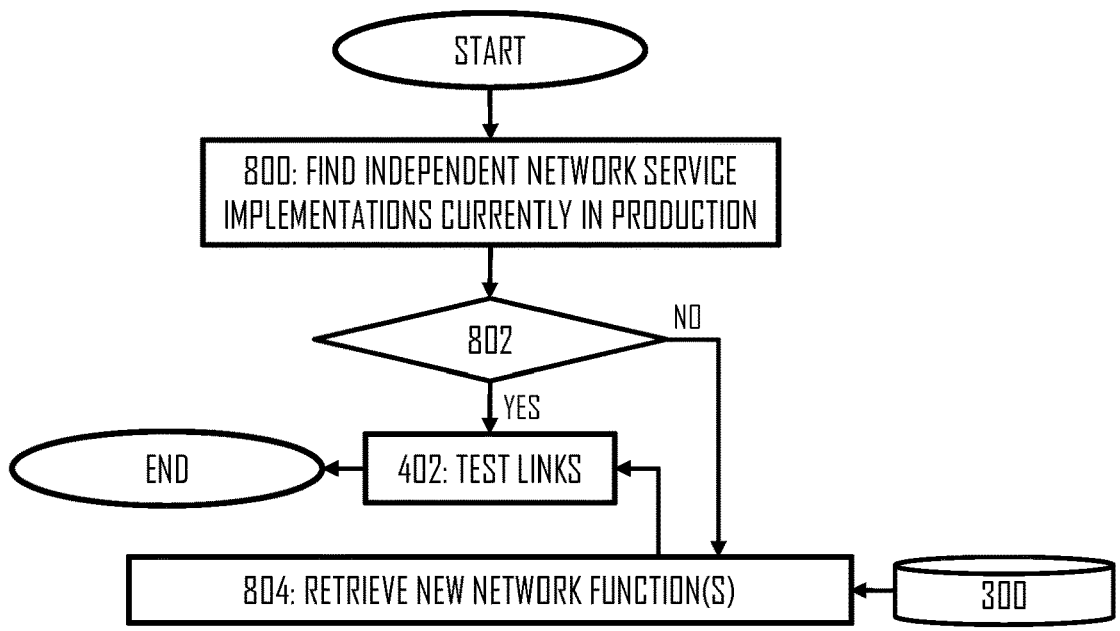

FIGS. 7 and 8 illustrate embodiments of the prioritization in the selection of new candidate network functions. The embodiment of FIG. 7 aims to maximize the number of new network service implementations while the embodiment of FIG. 8 aims to prioritize resiliency of the network service to failures.

Referring to FIG. 7, let us describe an embodiment of the prioritization that aims to maximize the number of new network service implementations or, from another perspective, aims to generate a new network service implementation with minimum effort. In the embodiment of FIG. 7, one or more new candidate network function(s) are selected for the link testing on the basis of a criterion where the selected candidate network function(s) provide a better capability of adding new network service implementations, considering a certain amount of link testing. In the process of FIG. 7, the testing system may first sort the network functions A, B, C, and D by a number of connected network functions, in an ascending order. For example, the network function A in FIG. 2, has one connected network function B, C and D have two connected network functions, and B has three connected network function. In practice, this means that by bringing one more implementation of the network function A to the production environment, only a single link testing is needed to add a new network service implementation. The network service implementation in the production environment may be understood as a unique combination of the network function implementations that provide the network service. When adding a new implementation of the network function B, links towards A, C, and D need to be tested first which results in a more complex testing scenario than for a new implementation of the network function A, for example. Therefore, the sorting prioritizes the network functions according to how fast a new network service implementation can be generated.

In block 702, the first one of the sorted network functions is selected and one or more candidate network functions associated with the selected network function are retrieved from the repository 300. The candidate network functions(s) is/are added to a candidate list. Furthermore, an active list is formed from network function implementations readily in the production environment. Block 704 comprises checking whether or not the candidate list is empty. If the candidate list is empty, the process may end. Otherwise, block 706 may be executed. In the first iteration, block 704 may be skipped. In block 706, one of the candidate network functions is selected from the candidate list. In block 706 or before the next execution of block 704, the selected candidate network function may be removed from the candidate list. In block 708, one or more network function implementations connected to the candidate network function in the network service is retrieved from the active list. The connections between the network functions in the network service defines the network function implementations retrieved in block 708. Then, the link testing may be performed in the above-described manner, and the process may return to block 704. If the link testing in block 402 results in a satisfactory link performance metric, block 404 may be executed to check whether or not a new candidate network service can be built.

Referring to FIG. 8, let us now describe a prioritization process that aims to improve the resiliency of the network service to failures. This prioritization aims to maximize the number of independent network service implementations and selects the new candidate network function (s) for testing according to that criterion. According to an aspect, the prioritization process may select one or more new candidate network functions so that a new independent network service implementation can be generated.

The resiliency of a network function may be defined by a number of network function implementations of the network function that need to fail in the production environment so that the network service can no longer be provided. According to an aspect, the resiliency of the network function equals to the number of network function implementations of the network function in the production environment. The resiliency of the network service may be understood as the minimum of the resiliencies of the network functions of the network service. It means that the weakest link or network function defines the resiliency of the network service.

In block 800, the testing system finds the independent network service implementations in the production environment. Block 800 may also comprise determining the network function implementations in the production environment and links that have been tested and verified to have the specified performance. Then, the testing system may determine in block 802 whether or not a new independent network service implementation may be built from the network function implementations currently in the production environment. This may be possible, for example, in a situation where the network operator provides different network services by using different combinations of the network functions. In such a case, certain network function implementations may be readily a part of one or more network service implementations but still provide a new independent network service implementation for another network service. Other scenarios may also be envisaged.

If the new independent network service can be generated by using the existing network function implementations in the production environment, the process may proceed to block 402 where the necessary links between the network function implementations forming the new independent network service implementation are tested. If the testing is positive, the new independent network service implementation may be forwarded to block 408 for E2E performance testing. In FIG. 8, the process is illustrated as ending from the perspective of the prioritization.

Upon determining in block 802, that no new independent network service implementation can be generated by using the existing network function implementations in the production environment, the process may proceed to block 804 where new candidate network functions that are needed to generate a new independent network service implementation are acquired from the repository 300. Thereafter, the link testing may be carried out in block 402 and the process may proceed to the E2E performance estimation in the above-described manner.

In an embodiment, the processes of FIGS. 7 and 8 may be combined to realize a prioritization procedure where both the minimized effort and the resilience are taken into account. In an embodiment, block 804 employs the prioritization procedure of FIG. 7 in the selection of the new candidate network functions. In another embodiment, the candidate network function selection employs both criteria, e.g. selects the candidate network functions that enable improvement in the resiliency of the network service with the lowest amount of link testing. In an embodiment, if a certain network function has a higher probability of experiencing failures, the prioritization procedure may prioritize provision of new network function implementations for such a network function.

Figure 9:
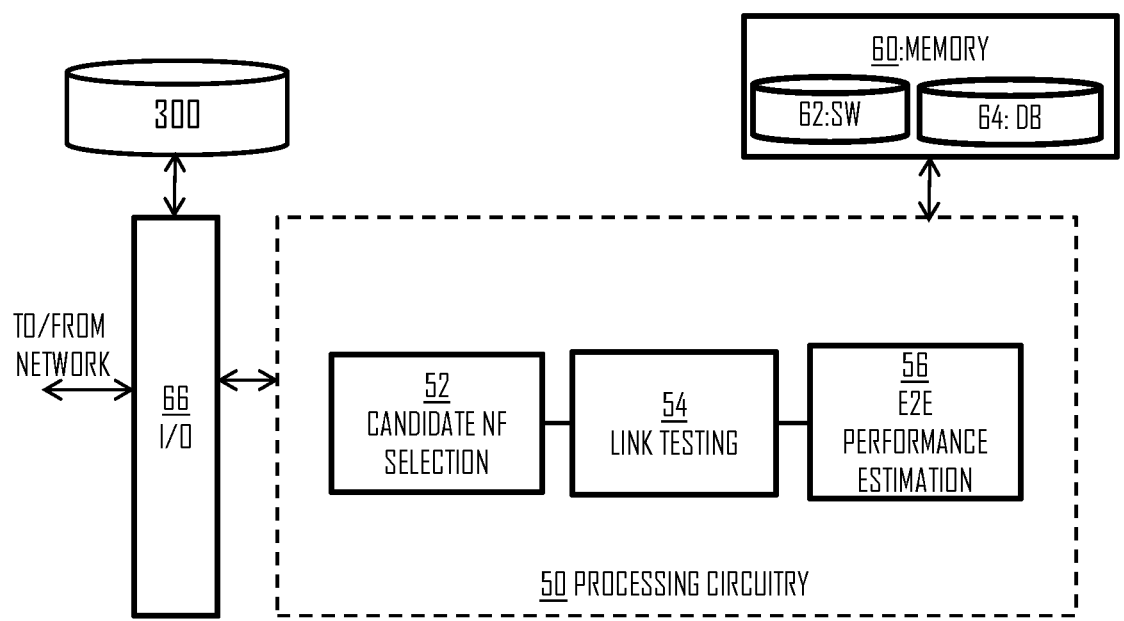
FIG. 9 illustrates a block diagram of an apparatus according to an embodiment of the invention.

FIG. 9 illustrates a block diagram of the testing system according to an embodiment of the invention. The testing system may be comprised in one or more server computers in the communication system of FIG. 1 or outside the communication system. The testing system may employ one or more physical or virtual servers to execute the embodiments described herein. Accordingly, the testing system may be provided by a single processing system or a distributed processing system. The testing system may be realized by, for example, one or more circuitries or one or more chipsets in such computers. The testing system may comprise one or more electronic devices comprising electronic circuitries.

Referring to FIG. 9, the testing system may comprise a processing circuitry 50 such as at least one processor, and at least one memory 60 including a computer program code (software) 62, wherein the at least one memory and the computer program code (software) are configured, with the at least one processor, to cause the testing system to carry out any one of the embodiments of the described above. The computer program code may define the selection of the candidate network function(s) for link testing, the link testing itself, and/or the E2E performance testing procedures, as described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing the current configuration of the neural network layer 502, for example.

The apparatus may further comprise a communication interface (I/O) 66 comprising hardware and/or software for realizing communication connectivity according to one or more communication protocols. The communication interface 66 may provide the apparatus with communication capabilities to communicate in the communication system. The communication interface 66 may, for example, provide an interface to a network service coordinator device coordinating the provision of the network service in the network. The communication interface 66 may further provide an interface to the repository 300 storing the different implementations of the network functions available to the network operator. The repository may be comprised in the communication network or be external to the communication network.

The processing circuitry 50 may realize the staging environment 310 and comprise a candidate network function (NF) selection circuitry 52 configured to carry out one or more of the blocks 400, 600, 702, and 804. Upon performing the selection of the candidate network function(s), the candidate network function selection circuitry may output the candidate network function(s) to a link testing circuitry 54 configured to carry out block 402 and, optionally, block 404. The link testing circuitry 54 may be configured to output the tested candidate network functions providing acceptable link performance to an E2E performance estimation circuitry 56 configured to carry out blocks 406 to 412 and, in some embodiments, block 602 and 404. Upon determining that the E2E performance of a candidate network service implementation is acceptable, the processing circuitry 50 may output the specifications of the candidate network service implementation to the production environment 320 through the interface 66.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An testing system, comprising:
   at least one processor, and
   at least one memory including a computer program code, wherein the at least one memory and the computer program code are configured, with the at least one processor, to cause the testing system to perform the following:
   acquiring, in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service;
   testing links between the candidate network functions of different network functions required by the network service and determining a link performance metric for each tested link;
   building a candidate network service for end-to-end performance estimation from candidate network functions having interfaces for which the link performance metrics indicate performance above a determined threshold;
   estimating an end-to-end performance metric for the candidate network service on the basis of the link performance metrics of the candidate network service; and
   outputting the candidate network service to a production environment on the basis of the estimated end-to-end performance metric.

2. The testing system of claim 1, wherein the at least one memory and the computer program code are configured, with the at least one processor, to cause the testing system to perform said testing of the links between the candidate network functions that comprises at least acquiring the candidate network functions from a network function repository that comprises a plurality of candidate network functions for each network function of the network service.

3. The testing system of claim 2, wherein the plurality of candidate network functions comprises different versions for the same network function.

4. The testing system of claim 1, wherein the at least one memory and the computer program code are configured, with the at least one processor, to cause the testing system to perform:
   selecting, on the basis of the estimated end-to-end performance metric, the candidate network service for end-to-end testing;
   applying one or more test procedures to test the end-to-end performance of the candidate network service and acquiring at least one test result indicating a tested end-to-end performance for the candidate network service; and
   using the at least one test result as an input when estimating the end-to-end performance metric for the candidate network service or for another candidate network service.

5. The testing system of claim 4, wherein the at least one memory and the computer program code are configured, with the at least one processor, to cause the testing system to perform: outputting the candidate network service to the production environment, if the at least one test result indicates end-to-end performance above a determined performance level.

6. The testing system of claim 1, wherein the at least one memory and the computer program code are configured, with the at least one processor, to cause the testing system to use a neural network when performing said estimating.

7. The testing system of claim 1, wherein the at least one memory and the computer program code are configured, with the at least one processor, to cause the testing system to provide a new candidate network service by performing at least the following:
   determining implementations of the network service that are currently in the production environment, each implementation formed by a set of network function implementations together implementing the network service;
   selecting at least one new candidate network function for testing on the basis of the determined implementations of the network service that are currently in the production environment;
   performing said link testing for a link between the selected new candidate network function and at least one network function implementation currently in the production environment; and
   performing said building for the new candidate network service from the new candidate network function and network function implementations that are currently in the production environment.

8. The testing system of claim 7, wherein the at least one memory and the computer program code are configured, with the at least one processor, to cause the testing system to select the at least one new candidate network function on the basis of a number of new implementations of the network service the new candidate network function can provide.

9. The testing system of claim 7, wherein the at least one memory and the computer program code are configured, with the at least one processor, to cause the testing system to select the at least one new candidate network function on the basis of improving resiliency of the network service for a situation where a network function in the production environment fails.

10. The testing system of claim 1, wherein the link performance metric and the end-to-end performance metric comprise at least one of the following performance metrics: quality-of-service, data throughput, latency, and error performance.

11. A method for testing an implementation of a network service provided in a network, the method comprising:
    acquiring, by a testing system operating in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service;
    testing, by the testing system, links between the candidate network functions of different network functions required by the network service and determining a link performance metric for each tested link;
    building, by the testing system, a candidate network service for end-to-end performance estimation from candidate network functions having interfaces for which the link performance metrics indicate performance above a determined threshold;

estimating, by the testing system, an end-to-end performance metric for the candidate network service on the basis of the link performance metrics of the candidate network service; and outputting, by the testing system, the candidate network service to a production environment on the basis of the estimated end-to-end performance metric.

12. The method of claim 11, wherein said testing of the links between the candidate network functions comprises acquiring the candidate network functions from a network function repository that comprises a plurality of candidate network functions for each network function of the network service.

13. The method of claim 12, wherein the plurality of candidate network functions comprises different versions for the same network function.

14. The method of claim 11, further comprising:
selecting, on the basis of the estimated end-to-end performance metric, the candidate network service for end-to-end testing;

applying one or more test procedures to test the end-to-end performance of the candidate network service and acquiring at least one test result indicating a tested end-to-end performance for the candidate network service; and using the at least one test result as an input when estimating the end-to-end performance metric for the candidate network service or for another candidate network service.

15. The method of claim 11, wherein said estimating is performed by using a neural network.

16. The method of claim 11, further comprising providing, by the testing system, a new candidate network service by performing at least the following:

determining implementations of the network service that are currently in the production environment, each implementation formed by a set of network function implementations together implementing the network service;

selecting at least one new candidate network function for testing on the basis of the determined implementations of the network service that are currently in the production environment;

performing said link testing for a link between the selected new candidate network function and at least one network function implementation currently in the production environment; and performing said building for the new candidate network service from the new candidate network function and network function implementations that are currently in the production environment.

17. The method of claim 16, wherein the at least one new candidate network function is selected on the basis of a number of new implementations of the network service the new candidate network function can provide.

18. The method of claim 16, wherein the at least one new candidate network function is selected on the basis of improving resiliency of the network service for a situation where a network function in the production environment fails.

19. The method of claim 12, wherein the link performance metric and the end-to-end performance metric comprise at least one of the following performance metrics: quality-of-service, data throughput, latency, and error performance.

20. A computer program embodied on a non-transitory computer-readable distribution medium and comprising instructions for causing an apparatus to perform at least the following:

acquiring, in an isolated staging environment, a plurality of candidate network functions of a network service, wherein the network service is defined by network functions required by the network service and links between the network functions, wherein the plurality of candidate network functions includes at least one candidate network function for each network function required by the network service and includes a plurality of candidate network functions for at least one network function required by the network service;

testing links between the candidate network functions of different network functions required by the network service and determining a link performance metric for each tested link;

building a candidate network service for end-to-end performance estimation from candidate network functions having interfaces for which the link performance metrics indicate performance above a determined threshold;

estimating an end-to-end performance metric for the candidate network service on the basis of the link performance metrics of the candidate network service; and outputting the candidate network service to a production environment on the basis of the estimated end-to-end performance metric.

* * * * *